(12) United States Patent
Ail et al.

(10) Patent No.: US 9,569,784 B2
(45) Date of Patent: *Feb. 14, 2017

(54) EFFICIENTLY RESOLVING THE VALUES FOR THE TAG PARAMETERS THEREBY SYNDICATING THE TAG DATA AS EARLY AS POSSIBLE

(71) Applicant: International Business Machines Corporation, Armonk, NY (US)

(72) Inventors: Roshan C. Ail, San Carlos, CA (US); Jayalakshmi P. Atmacharan, Milpitas, CA (US); Vijay Bhombore-Rao, San Ramon, CA (US); Trevor J. Bodz, Austin, TX (US); Rohit F. Colaco, Belmont, CA (US); Robert S. Keller, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 14/305,896

(22) Filed: Jun. 16, 2014

(65) Prior Publication Data

US 2015/0137952 A1    May 21, 2015

Related U.S. Application Data

(63) Continuation of application No. 14/084,860, filed on Nov. 20, 2013.

(51) Int. Cl.
*G06Q 30/02* (2012.01)
*G06Q 30/00* (2012.01)
(Continued)

(52) U.S. Cl.
CPC ......... *G06Q 30/02* (2013.01); *G06F 17/30864* (2013.01); *G06Q 30/00* (2013.01); *H04L 67/02* (2013.01)

(58) Field of Classification Search
CPC ... G06F 17/30864; G06Q 30/00; G06Q 30/02; H04L 67/02
See application file for complete search history.

(56) References Cited

U.S. PATENT DOCUMENTS 6,622,168 B1    9/2003   Datta
8,396,834 B2    3/2013   Bahadori et al.
(Continued)

OTHER PUBLICATIONS

Office Action for U.S Appl. No. 14/084,860 dated Apr. 7, 2016, pp. 1-10.

*Primary Examiner* — Chirag R Patel
(74) *Attorney, Agent, or Firm* — Robert A. Voigt, Jr.; Winstead, P.C.

(57) ABSTRACT

A method, system and computer program product for resolving values of parameters of tags. A map is created which includes the number of times each parameter is referenced by the tags in a web page requested by a client device. The parameters in the map are then sorted in a list in descending order based on the number of times referenced by the tags. The value for the parameter listed at the top of the list is looked up. If the value cannot be located, then those tags that are associated with this parameter are added to a list of tags to be ignored. By ignoring such tags in this list, the resolving of tag values for tags to be syndicated can occur more quickly and efficiently, including syndicating the tag data before the web page is completely loaded.

12 Claims, 6 Drawing Sheets

(51) Int. Cl.
   *G06F 17/30* (2006.01)
   *H04L 29/08* (2006.01)

(56) References Cited

U.S. PATENT DOCUMENTS

| | | |
|---|---|---|
| 2003/0225614 A1 | 12/2003 | Rodriguez et al. |
| 2007/0033105 A1 | 2/2007 | Collins et al. |
| 2010/0088373 A1* | 4/2010 | Pinkham ............... G06Q 30/02 709/204 |
| 2010/0281008 A1 | 11/2010 | Braunwarth |
| 2010/0329219 A1* | 12/2010 | Zwaal .................. G06F 19/345 370/336 |
| 2011/0022704 A1 | 1/2011 | Duan et al. |
| 2013/0073401 A1* | 3/2013 | Cook .................... G06Q 30/02 705/14.73 |
| 2013/0282485 A1 | 10/2013 | Barsoba et al. |
| 2014/0278986 A1 | 9/2014 | Rouse et al. |
| 2014/0372572 A1 | 12/2014 | Lunt et al. |

* cited by examiner

EFFICIENTLY RESOLVING THE VALUES FOR THE TAG PARAMETERS THEREBY SYNDICATING THE TAG DATA AS EARLY AS POSSIBLE

TECHNICAL FIELD

The present invention relates generally to online marketing and advertising, and more particularly to efficiently resolving the values for the tag parameters thereby syndicating the tag data as early as possible.

BACKGROUND

Current web pages utilize a variety of HTML tags from vendors for purposes of ad serving and tracking user behavior. A "tag" is a snippet of code that collects data, targets your ad campaign, tracks ads and performs other functions. An example of an HTML tag is the iFrame container which is used by many ad servers to place ads within web pages. Many other tags exist and each has a specific purpose (e.g., digital marketing, display remarking, web page analysis). A vendor may support various different "tag types," such as the page view tag, product view tag, order tag, etc. Each tag may be associated with one or more parameters, whose values are needed to be resolved at runtime (when the web page is loading) prior to syndicating (i.e., making available) the tag data, such as to the vendor's server. These values may be obtained from various elements (e.g., DOM elements, JavaScript elements, URL parameters, cookies) on the web page.

While HTML tags are necessary for many of today's websites, especially e-commerce sites, the main disadvantage of such tags is the requirement that all of the values of the tag parameters be resolved (obtained and validated) prior to syndicating the tag data, such as to the vendor's server. Some of these parameter values may not be immediately available, and as a result, such values may be looked up repeatedly in an attempt to resolve the parameter values thereby slowing page load times. Furthermore, the value of parameters, such as the parameters of JavaScript tags, may be obtained using the eval( ) function to obtain the value of the parameters. If there are a lot of parameters to be resolved, then there may be many eval( ) function calls leading to slower page load loads. Such slow page load times frustrate end users and lead to higher web page abandonment rates and thus potentially lower revenue for web page publishers.

As a result, there is not currently a means for efficiently resolving the values for the tag parameters thereby syndicating the tag data as early as possible even before the web page is completely loaded.

BRIEF SUMMARY

In one embodiment of the present invention, a method for resolving values of parameters of tags comprises tracking a number of times each parameter is referenced by tags in a web page, where each of the tags comprises code that collects data and where each of the tags is associated with one or more parameters. The method further comprises building, by a processor, a map containing the tracked number of times each parameter is referenced by the tags. Additionally, the method comprises sorting the map by listing parameters in descending order in a list based on the number of times referenced by the tags. Furthermore, the method comprises looking up a value of a first parameter listed at a top of the list. In addition, the method comprises locating tags that are associated with the first parameter in response to not locating the value of the first parameter. The method further comprises adding the tags that are associated with the first parameter in a list of tags to be ignored in response to not locating the value of the first parameter.

Other forms of the embodiment of the method described above are in a system and in a computer program product.

In another embodiment of the present invention, a method for resolving values of parameters of tags comprises identifying a parameter of a tag in a web page in a nested expression format, where the tag comprises code that collects data. The method further comprises breaking up, by a processor, the nested expression into components. The method additionally comprises processing a leftmost component of the nested expression that has not yet been processed. Furthermore, the method comprises processing a subsequent leftmost component of the nested expression that has not yet been processed in response to obtaining a value of the leftmost component of the nested expression. In addition, the method comprises returning a value of the nested expression format in response to obtaining a value for each of the components of the nested expression, where the returned value corresponds to a value of a rightmost component of the nested expression.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for resolving the values of parameters of tags. In one embodiment of the present invention, a map (referred to herein as the "counter map") is created which includes the number of occurrences each parameter is referenced by or associated with a tag in a web page requested by a client device. A "tag," as used herein, refers to code that collects data, where each tag is associated with one or more parameters. The parameters in the counter map are then sorted in a list in descending order based on the number of tag associations. The value for the parameter listed at the top of the list is looked up. The value may be obtained from a cache or outside of a cache or may not be located. If the value is obtained outside of the cache, then the value is cached for future use. When the value is located, the value for that parameter in all of the tags which are associated with that parameter are updated and the parameter is removed from the list. However, when the value is not located, those tags that are associated with this parameter are added to a list of tags to be ignored. By ignoring such tags in this list, the resolving of tag values for tags to be syndicated can occur more quickly and efficiently, including syndicating the tag data before the web page is completely loaded.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
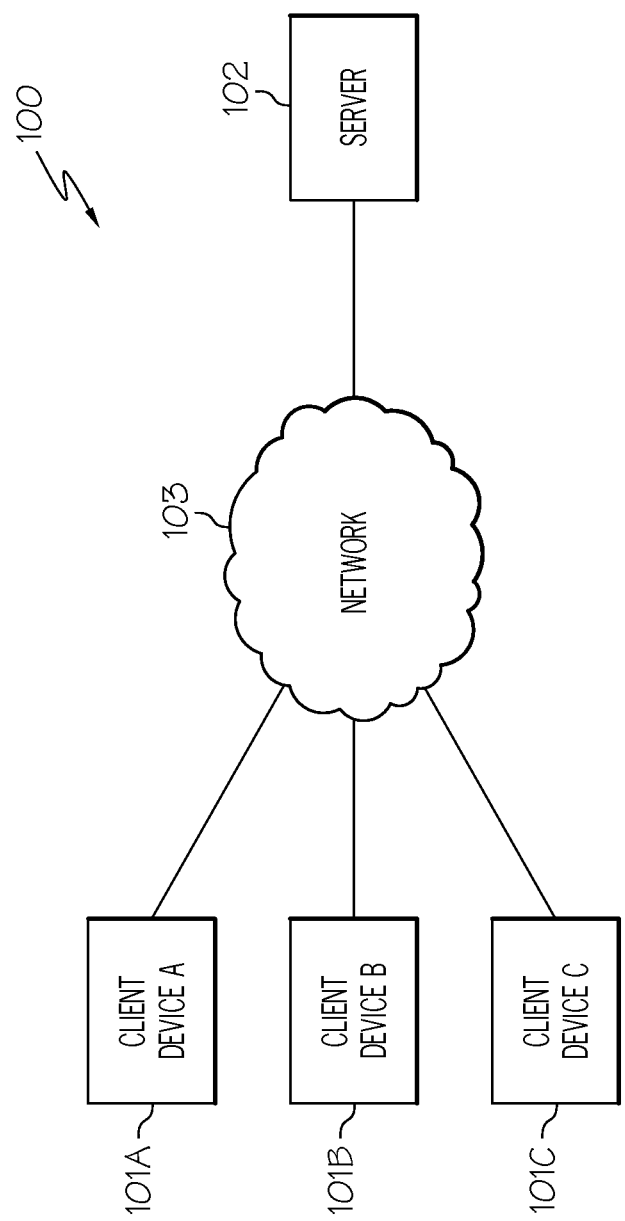
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. A description of the hardware configuration of client 101 is provided below in connection with FIG. 2.

In one embodiment, server 102 may be a web server configured to host websites. In one embodiment, server 102 is configured to receive a request from client device 101 to load a web page which is then transmitted to the requesting client device 101. In one embodiment, the requested web page may contain one or more "tags." Tags, as used herein, refer to a snippet of code that collects data, targets an ad campaign, tracks ads and performs other functions. Examples of tags include a "page view tag" which is used to collect information about the web page being viewed by the user of client device 101. Another example of a tag is a "product view tag" which is used to collect information about a particular product being viewed by the user of client device 101. A further example of a tag is a "shop tag" that is used to collect information about the user's shopping cart. Other examples include an "order tag" used to collect information about a user's order as well as an "abandonment tag" used to collect information about a user deciding against to purchase an item that was previously placed in the shopping cart.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C, a single server 102 and a single network 103, network system 100 may include any number of clients 101, servers 102 and networks 103. The embodiments of network system 100 are not to be limited in scope to the depiction of FIG. 1.

Figure 2:
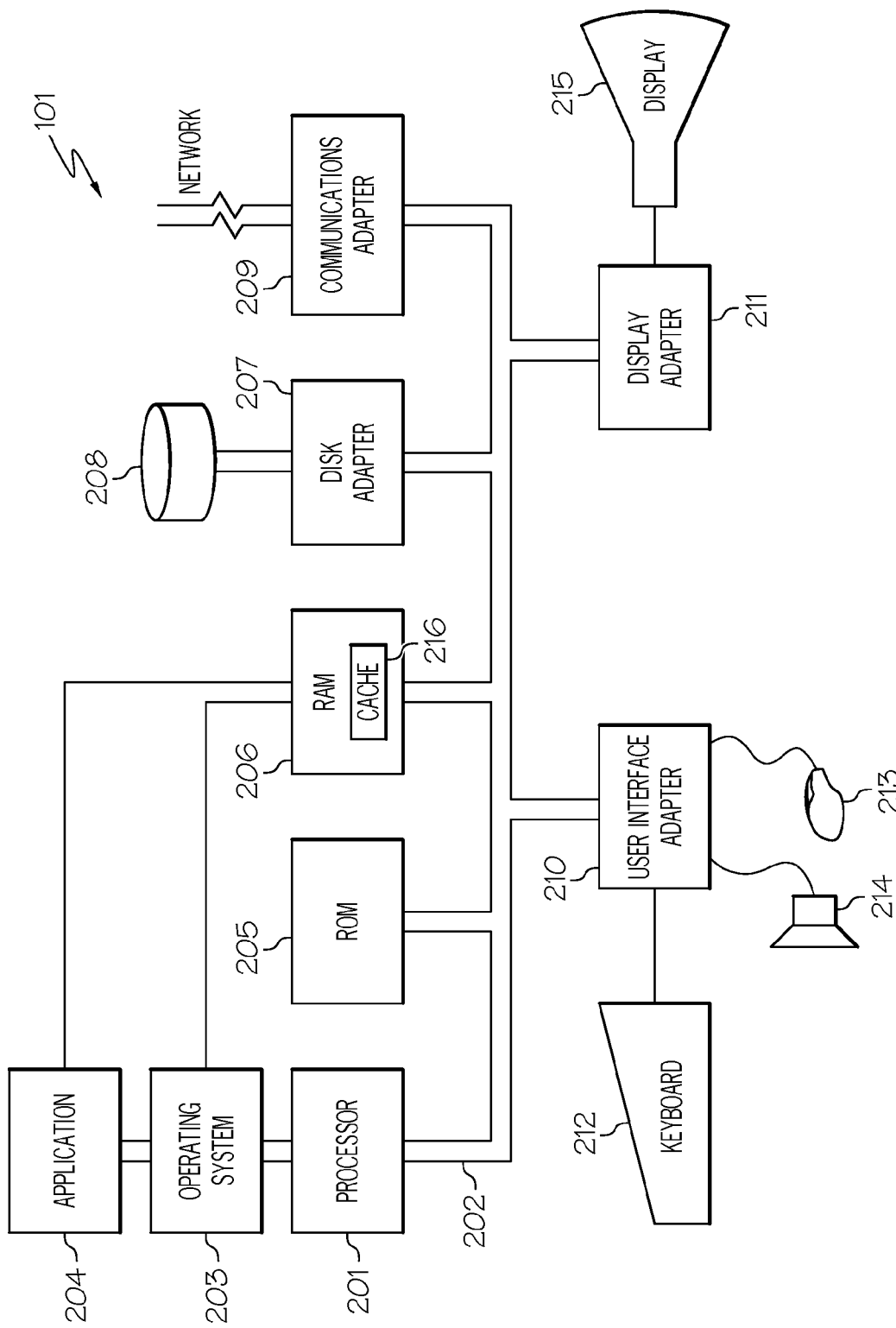
FIG. 2 illustrates a hardware configuration of a client device in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser configured to efficiently resolve the values for the tag parameters thereby syndicating the tag data as early as possible as discussed further below in association with FIGS. 3-7.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive.

Client device 101 may further include a communications adapter 209 coupled to bus 202. Communications adapter 209 interconnects bus 202 with an outside network (e.g., network 103 of FIG. 1) thereby enabling client device 101 to communicate with other client devices 101 and server 102.

I/O devices may also be connected to client device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101 through keyboard 212 or mouse 213 and receiving output from client device 101 via display 215 or speaker 214.

Client device 101 further includes a cache, such as cache 216 in memory 206, configured to store parameter values thereby allowing parameter values to be more efficiently obtained. It is noted that cache 216 may reside in other locations (e.g., disk unit 208, internally to processor 201) and that cache 216 may be part of another cache.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As stated in the Background section, while HTML tags are necessary for many of today's websites, especially e-commerce sites, the main disadvantage of such tags is the requirement that all of the values of the tag parameters be resolved (obtained and validated) prior to syndicating the tag data, such as to the vendor's server. Some of these parameter values may not be immediately available, and as a result, such values may be looked up repeatedly in an attempt to resolve the parameter values thereby slowing page load times. Furthermore, the value of parameters, such as the parameters of JavaScript tags, may be obtained using the eval( ) function to obtain the value of the parameters. If there are a lot of parameters to be resolved, then there may be many eval( ) function calls leading to slower page load loads. Such slow page load times frustrate end users and lead to higher web page abandonment rates and thus potentially lower revenue for web page publishers. As a result, there is not currently a means for efficiently resolving the values for the tag parameters thereby syndicating the tag data as early as possible even before the web page is completely loaded.

Figure 3:
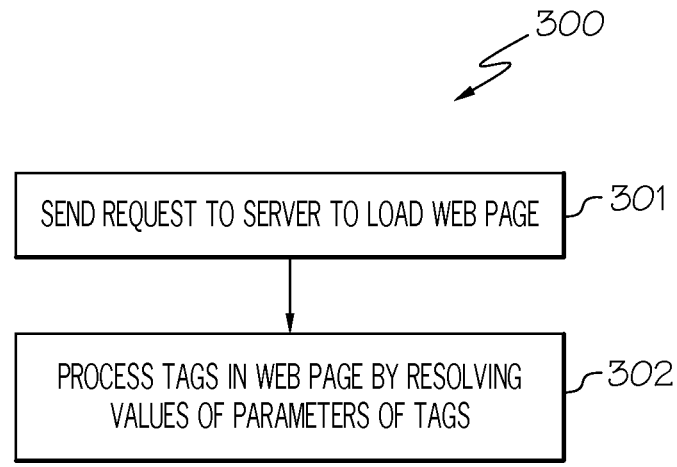
FIG. 3 is a flowchart of a method for a user of a client device to access a web page in accordance with an embodiment of the present invention.
Figure 4:
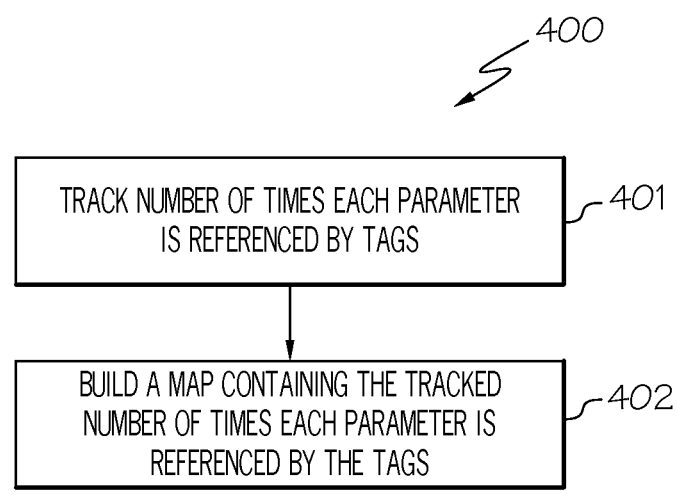
FIG. 4 is a flowchart of a method for creating a counter map in accordance with an embodiment of the present invention.
Figure 5:
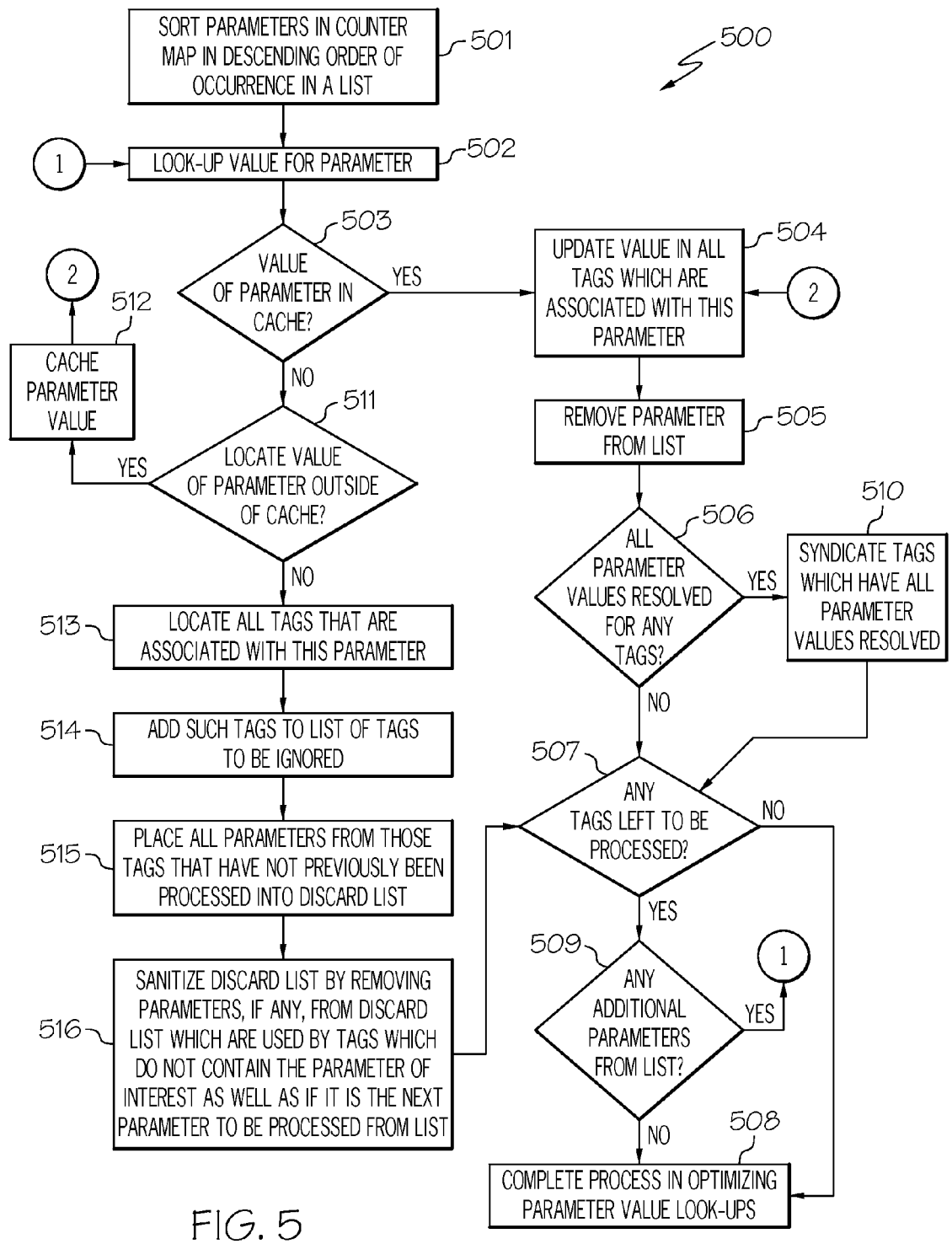
FIG. 5 is a flowchart of a method for optimizing the look-up of parameter values of tags in accordance with an embodiment of the present invention.
Figure 6:
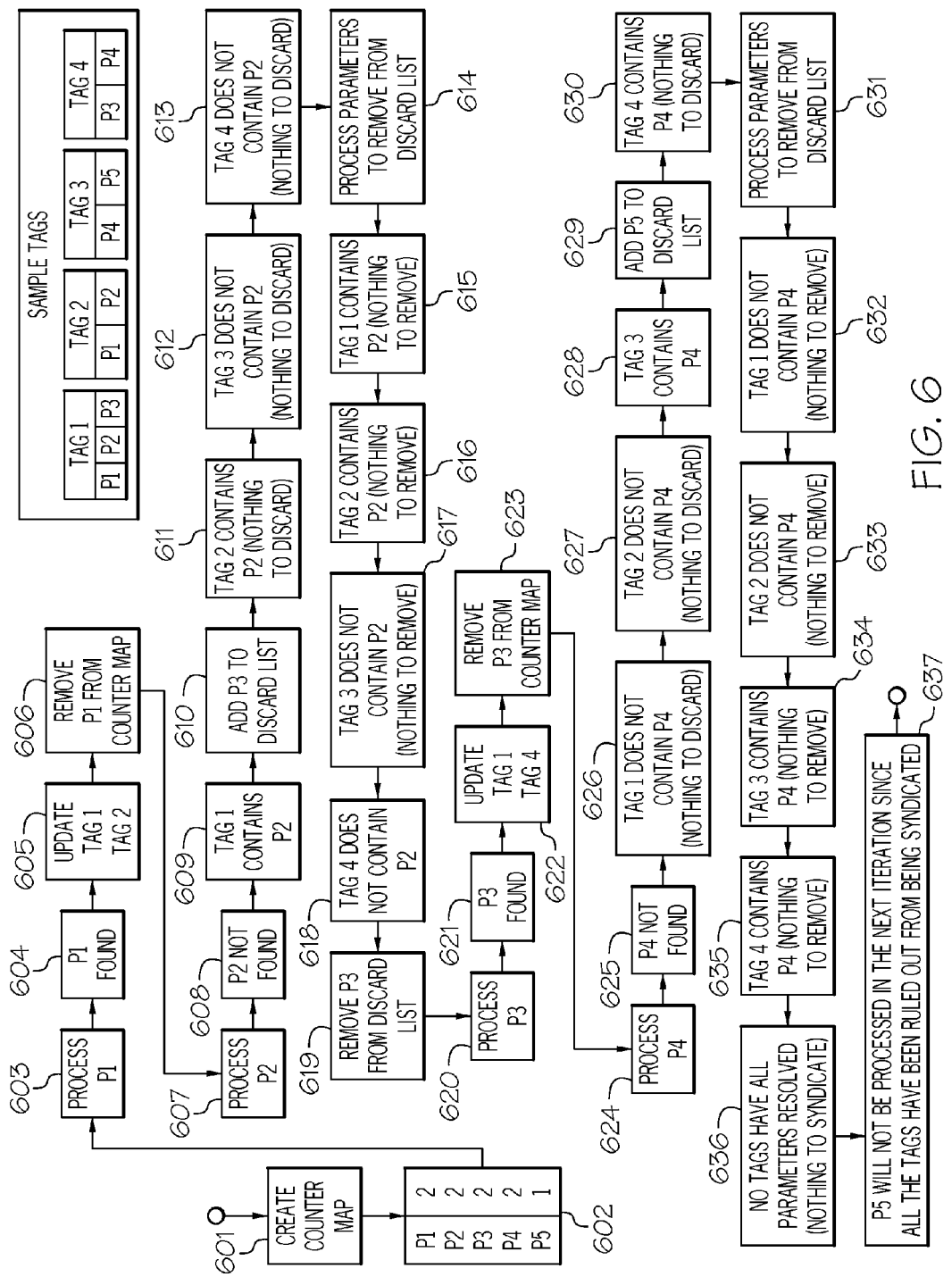
FIG. 6 is a diagram illustrating an example of implementing the method of FIG. 5 in accordance with an embodiment of the present invention.
Figure 7:
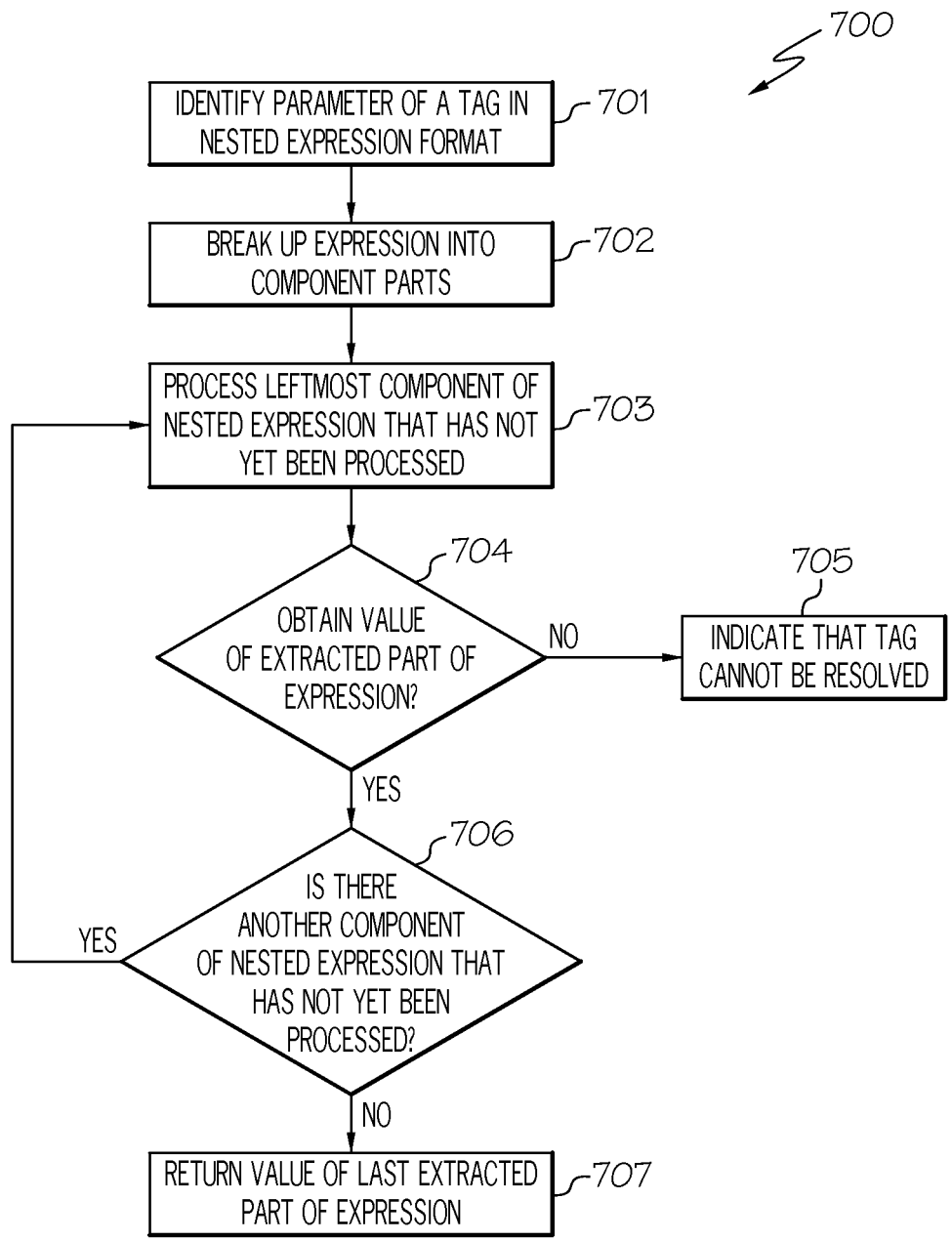
FIG. 7 is a flowchart of an alternative method for optimizing the look-up of parameter values of tags in accordance with an embodiment of the present invention.

The principles of the present invention provide a means for efficiently resolving the values for the tag parameters thereby syndicating the tag data as early as possible even before the web page is completely loaded as discussed further below in association with FIGS. 3-7. FIG. 3 is a flowchart of a method for a user of a client device 101 to access a web page. FIG. 4 is a flowchart of a method for creating a counter map. FIG. 5 is a flowchart of a method for optimizing the look-up of parameter values of tags. FIG. 6 is a diagram illustrating an example of implementing the method of FIG. 5. FIG. 7 is a flowchart of an alternative method for optimizing the look-up of parameter values of tags.

As stated above, FIG. 3 is a flowchart of a method 300 for a user of a client device 101 to access a web page in accordance with an embodiment of the present invention.

Referring to FIG. 3, in conjunction with FIGS. 1-2, in step 301, client device 101 sends a request to server 102 to load a web page (e.g., http://amazon.com).

In step 302, client device 101 processes the tags in the web page by resolving the values of the parameters of the tags as discussed further below.

A detailed description of resolving the values of the parameters of the tags using the principles of the present invention is discussed below in connection with FIGS. 4-7.

Referring now to FIG. 4, FIG. 4 is a flowchart of a method 400 for creating, what is referred to herein as "a counter map," in accordance with an embodiment of the present invention. A counter map refers to a map or listing of the parameters referenced by or associated with the tags in the loaded web page.

Referring to FIG. 4, in conjunction with FIGS. 1-2, in step 401, client device 101 tracks the number of times each parameter is referenced by or associated with the tags in the requested web page. Each tag includes code that collects data, where each of the tags is associated with one or more parameters.

In step 402, client device 101 builds a map (referred to herein as the "counter map") containing the tracked number of times each parameter is referenced by or associated with the tags in the requested web page.

Upon building the counter map, the map may be used to optimize the look-up of parameter values of tags using the method of FIG. 5.

FIG. 5 is a flowchart of a method 500 for optimizing the look-up of parameter values of tags in accordance with an embodiment of the present invention.

Referring to FIG. 5, in conjunction with FIGS. 1-2 and 4, in step 501, client device 101 sorts the parameters in the counter map in descending order of occurrence in the tags (number of tag associations) in the loaded web page in a list as illustrated in FIG. 6. FIG. 6 is an illustration of implementing the method of FIG. 5 in accordance with an embodiment of the present invention. Referring to FIG. 6, there are four tags, Tag 1, Tag 2, Tag 3 and Tag 4, that are assumed to be present in the web page requested by client device 101. Tag 1 is associated with parameters identified as P1, P2 and P3. Tag 2 is associated with parameters P1 and P2. Tag 3 is associated with parameters P4 and P5. Tag 4 is associated with parameters P3 and P4. As indicated in FIG. 6, the "counter map" was created in step 601 using method 400 of FIG. 4. Upon creating the counter map in step 601, the parameters are sorted in descending order of occurrence in a list as shown in element 602, where parameter P1 occurs two times (referring to being associated with Tag 1 and Tag 2), parameter P2 occurs two times (referring to being associated with Tag 1 and Tag 2), parameter P3 occurs two times (referring to being associated with Tag 1 and Tag 4), parameter P4 occurs two times (referring to being associated with Tag 3 and Tag 4) and parameter P5 occurs one times (referring to being associated with Tag 3).

Returning to FIG. 5, in conjunction with FIGS. 1-2, 4 and 6, in step 502, client device 101 looks up the value for the parameter listed at the top of the list.

In step 503, a determination is made by client device 101 as to whether the value for the parameter has previously been cached, such as in cache 216.

If the parameter value has been previously cached, then, in step 504, client device 101 updates the value of the parameter in all of the tags which are associated with the parameter. By having the parameter value previously cached, the value may be obtained more quickly than obtaining the parameter value via a look-up procedure.

In step 505, client device 101 removes the parameter from the list.

In step 506, a determination is made by client device 101 as to whether all the parameter values for a tag have been resolved.

If not all of the parameter values for a tag have been resolved, then, in step 507, a determination is made by client device 101 as to whether there are any tags left to be processed (excluding those tags that have been syndicated as well as those tags placed in the list of tags to be ignored which is discussed further below).

If there are no more tags to be processed, then the process (method 500) in optimizing the parameter value look-ups is completed in step 508.

If, however, there are more tags to be processed, then, in step 509, a determination is made by client device 101 as to whether there are more parameters in the list to be processed.

If there are more parameters in the list to be processed, then client device 101 looks up the value for the next parameter that is now listed at the top of the list in step 502.

If, however, there are no more parameters in the list to be processed, then the process (method 500) in optimizing the parameter value look-ups is completed in step 508.

Returning to step 506, if all of the parameter values for a tag have been resolved, then, in step 510, the tag is syndicated (i.e., broadcasted), such as to the vendor's server. For example, the tag may correspond to a product tag for HP® products. If all of the parameters values for that tag have been resolved, then the tag may be syndicated to a server at HP®.

Upon syndicating the tag, a determination is made by client device 101 as to whether there are any tags left to be processed (excluding those tags that have been syndicated as well as those tags placed in the list of tags to be ignored which is discussed further below) in step 507.

Returning to step 503, if the parameter value has not been previously cached, then, in step 511, a determination is made by client device 101 as to whether the parameter value can be located outside of cache 216.

If client device 101 locates the parameter value outside of cache 216, then, in step 512, client device 101 caches the parameter value in cache 216 for future use thereby allowing that parameter value to be obtained more quickly than obtaining the parameter value via a look-up procedure. Upon caching the parameter value, client device 101 updates the value of the parameter in all of the tags which are associated with the parameter in step 504.

An illustration of locating the parameter value, whether in cache 216 or outside of cache 216, and updating the parameter value in all of the tags which are associated with the parameter is discussed below in connection with FIG. 6.

As illustrated in FIG. 6, parameter P1 is initially listed at the top of the list (see element 602). As a result, the parameter at the top of the list (e.g., parameter P1) is processed in step 603. A determination is made as to whether the value for parameter P1 is found, whether in cache 216 or outside of cache 216. In the example of FIG. 6, the value of parameter P1 is found in step 604. As a result, the value of the parameter P1 is updated in all of the tags (e.g., Tag 1 and Tag 2) which are associated with the parameter P1 in step 605. The parameter P1 is then removed from the list in step 606 thereby causing parameter P2 to be listed at the top of the list to be processed in step 607. A discussion of the example of processing parameter P2 will be discussed further below.

Returning to FIG. 5, in conjunction with FIGS. 1-2, 4 and 6, as discussed above, a determination is made by client device 101 as to whether the parameter value can be located outside of cache 216 in step 511.

If the parameter value cannot be located, then, in step 513, client device 101 locates all the tags that are associated with this parameter.

In step 514, client device 101 adds such tags (tags identified in step 513) to a list for those tags to be ignored in future iterations of method 500. As a result, the tags that are listed in this list can be ignored in future iterations thereby syndicating those tags (i.e., the tag data for these tags) whose tag values can be resolved more quickly and efficiently, including syndicating the tag data before the web page is completely loaded.

In step 515, client device 101 places all the parameters from those tags that have not previously been processed (those parameters in the counter map list that have not yet been processed) into a list, referred to herein as the "discard list." The discard list includes the parameters that are no longer to be considered to be processed (i.e., they will not be available in the counter map list to be processed). Parameters from these tags that have not previously been processed are placed in the discard list to avoid looking up the values for these remaining parameters since these tags are not going to be syndicated in the current run. These tags are not going to be syndicated in the current run since not all of their parameter values can be resolved. There is already at least one parameter value associated with these tags that cannot be resolved (i.e., cannot be located). As a result of creating such a list thereby not processing parameters for tags that will not be syndicated, those tags whose tag values can be resolved will be resolved more quickly thereby syndicating such tags (i.e., the tag data for these tags) more efficiently, including syndicating the tag data before the web page is completely loaded.

In step 516, client device 101 performs a process, referred to herein as "sanitizing," whereby parameters, if any, are removed from the discard list which are used by tags which do not contain the parameter of interest that was not located as well as removing a parameter from the discard list if it is the next parameter in the list to be processed. By removing these parameters from the discard list, they are placed back into the counter map list thereby ensuring that those parameters will be processed.

An example of not locating a parameter value as well as the use of the discard list and sanitizing the discard list will now be discussed in connection with FIG. 6. As discussed above, parameter P2 is the next parameter to be processed. In the example of FIG. 6, the value of parameter P2 could not be located in step 608. As a result, all the tags that are associated with parameter P2 are located. As illustrated in FIG. 6, Tag 1 and Tag 2 are associated with parameter P2. In step 609 of FIG. 6, Tag 1 is associated (or contains) parameter P2. As a result, the other parameters of Tag 1 (e.g., parameter P3) that have not yet been processed are placed in the discard list. Furthermore, Tag 1 is placed in the list of tags to be ignored. Since the value of one of its parameters cannot be resolved, Tag 1 cannot be syndicated. Hence, the tag can be ignored in future iterations thereby syndicating those tags (i.e., the tag data for these tags) whose tag values can be resolved more quickly and efficiently, including syndicating the tag data before the web page is completely loaded. Furthermore, Tag 2 is placed in the list of tags to be ignored. Since the value of one of its parameters cannot be resolved, Tag 2 cannot be syndicated.

Referring again to the example of FIG. 6, parameter P3 is placed in the discard list in step 610. With respect to Tag 2, while it is associated with parameter P2, Tag 2 is only associated with parameters P1 and P2, where parameter P1 has already previously been processed. Hence, there are no parameters associated with Tag 2 to be discarded as evidenced in step 611. Furthermore, Tag 3 and Tag 4 are not associated with parameter P2 thereby do not have any parameters to discard as shown in steps 612-613. The discard list is then sanitized in step 614. As discussed above, parameters, if any, are removed from the discard list which are used by tags which do not contain the parameter of interest that was not located as well as removing a parameter from the discard list if it is the next parameter in the list to be processed. Based on this analysis, there are no parameters listed in the discard list that are associated with tags which do not contain the parameter of interest as shown in steps 615-618. If, however, the parameter P5 was listed in the discard list, then it would have been removed from the discard list since Tag 3 (associated with parameter P5) is not associated with parameter P2. By removing parameter P5 from the discard list, it will then be placed back into the counter map list to be processed.

As further illustrated in FIG. 6, parameter P3 is removed from the discard list and placed back into the counter map list since it is the next parameter to be processed in the counter map list as seen in step 619.

In the next iteration, parameter P3 (now listed at the top of the list) is processed in step 620. In the example of FIG. 6, the value of parameter P3 is found in step 621. As a result, the value of the parameter P3 is updated in all of the tags (e.g., Tag 1 and Tag 4) which are associated with the parameter P3 in step 622. The parameter P3 is then removed from the list in step 623 thereby causing parameter P4 to be listed at the top of the list to be processed in step 624.

In the example of FIG. 6, the value of parameter P4 could not be located in step 625. As a result, all the tags that are associated with parameter P2 are located. As illustrated in steps 626 and 627, tags Tag 1 and Tag 2 are not associated with parameter P4. However, as illustrated in FIG. 6, both Tag 3 and Tag 4 are associated with parameter P4. Hence, both tags will be placed in the list of tags to be ignored. Since all of the tags (Tag 1, Tag 2, Tag 3 and Tag 4) are now placed in the list of tags to be ignored, in this example, there are no tags left to be syndicated as discussed further below.

As shown in step 628, Tag 3 is associated (contains) parameter P4. As a result, the other parameters of Tag 3 (e.g., parameter P5) that have not yet been processed are placed in the discard list. Furthermore, Tag 3 is placed in the list of tags to be ignored. Since the value of one of its parameters cannot be resolved, Tag 3 cannot be syndicated. Hence, the tag can be ignored in future iterations thereby syndicating those tags (i.e., the tag data for these tags) whose tag values can be resolved more quickly and efficiently, including syndicating the tag data before the web page is completely loaded.

Referring again to the example of FIG. 6, parameter P5 is placed in the discard list in step 629. With respect to Tag 4, while it is associated with parameter P4, Tag 4 is only associated with parameters P3 and P4, where parameter P3 has already previously been processed. Hence, there are no parameters associated with Tag 4 to be discarded as evidenced in step 630.

The discard list is then sanitized in step 631. As discussed above, parameters, if any, are removed from the discard list which are used by tags which do not contain the parameter of interest that was not located as well as removing a parameter from the discard list if it is the next parameter in the list to be processed. Based on this analysis, there are no parameters listed in the discard list that are associated with tags which do not contain the parameter of interest as shown in steps 632-635.

Since there are no tags left to be processed (each of the tags, Tag 1, Tag 2, Tag 3 and Tag 4, have been placed in the list of tags to be ignored since not all of their parameter values can be resolved) as shown in step 636, then the process in optimizing the parameter value look-ups is completed. As a result, the next parameter P5 which is scheduled to be processed will not be processed since there are no other tags to be processed as indicated in step 637.

An alternative embodiment for optimizing the look-up of parameter values of tags may involve the use of parameters of tags that are in a nested expression format. For example, the parameter of a tag, such as "products.camera(2).zoom," is an example of a nested expression, where "products" and "cameras" are objects, the number "2" is an index and "zoom" is a variable. In such a format, the look-up of parameter values can be optimized using the process described in connection with FIG. 7.

FIG. 7 is a flowchart of an alternative method 700 for optimizing the look-up of parameter values of tags in accordance with an embodiment of the present invention.

In step 701, client device 101 identifies a parameter of a tag in a web page in a nested expression format, such as "products.camera(2).zoom."

In step 702, client device 101 breaks up the expression into its component parts, such as "products," "camera," "(2)," and "zoom" for the expression of "products.camera(2).zoom."

In step 703, client device 101 processes the leftmost component of the nested expression that has not yet been processed. In the example of "products.camera(2).zoom," the leftmost component of the nested expressed that has not yet been processed is the object "products."

In step 704, a determination is made by client device 101 as to whether the value of the extracted part of the expression has been obtained.

If the value of the extracted part of the expression cannot be obtained, then, in step 705, client device 101 indicates that the tag cannot be resolved.

If, however, the value of the extracted part of the expression can be obtained, then, in step 706, a determination is made by client device 101 as to whether there is another component of the nested expressed that has not yet been processed.

If there is another component of the nested expression that has not yet been processed, then client device 101 processes the leftmost component of the nested expression that has not yet been processed in step 703. For example, in the first iteration, the object "products" in the nested expression "products.camera(2).zoom" was processed. If the value for the object "products" was obtained, then the next component, the object "camera," will be processed in the subsequent iteration and so forth.

Returning to step 706, if, however, all of the components of the nested expression have been processed, then, in step 707, client device 101 returns the value of the last extracted part of the expression. In the above example, client device 101 would return the value of the variable "zoom" in the nested expression "products.camera(2).zoom."

As discussed in the Background section, the value of parameters, such as parameters of JavaScript tags, may be obtained using the eval( ) function to obtain the value of the parameters. However, if there are a lot of parameters to be resolved, then there may be many eval( ) function calls leading to slower page load loads. Furthermore, when using the eval( ) function, the entire nested expression is evaluated as a whole which takes longer to evaluate than the components of the nested expression. Hence, by breaking up the expression into its component parts and processing each of the component parts individually (where each component is processed only if a value for the previous component to the left of the component has been obtained), the value for the parameter can be obtained more quickly thereby syndicating tag data more quickly, including syndicating the tag data before the web page is completely loaded.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for resolving values of parameters of tags, the method comprising:

tracking a number of times each parameter is referenced by tags in a web page, wherein each of said tags comprises code that collects data, wherein each of said tags is associated with one or more parameters;

building, by a processor, a map containing said tracked number of times each parameter is referenced by said tags;

sorting said map by listing parameters in descending order in a list based on said number of times referenced by said tags;

looking up a value of a first parameter listed at a top of said list;

locating tags that are associated with said first parameter in response to not locating said value of said first parameter; and adding said tags that are associated with said first parameter in a list of tags to be ignored in response to not locating said value of said first parameter.

2. The method as recited in claim 1 further comprising:
sending a request to load said web page to a web server; and
processing said tags in said web page by resolving values of parameters of said tags in said web page.

3. The method as recited in claim 1 further comprising:
updating said value of said first parameter in all tags which are associated with said first parameter in response to locating said value of said first parameter; and
removing said first parameter from said list in response to locating said value of said first parameter.

4. The method as recited in claim 3 further comprising:
obtaining said value of said first parameter from a cache in response to previously caching said value of said first parameter.

5. The method as recited in claim 3 further comprising:
caching said value of said first parameter in response to locating said value of said first parameter outside of said cache.

6. The method as recited in claim 3 further comprising:
looking up a value of a second parameter listed subsequently below said first parameter in response to removing said first parameter from said list.

7. The method as recited in claim 1 further comprising:
syndicating one or more tags upon resolving all parameter values associated with said one or more tags.

8. The method as recited in claim 1 further comprising:
placing all parameters from said tags associated with said first parameter that have not previously been processed into a discard list in response to not locating said value of said first parameter.

9. The method as recited in claim 8 further comprising:
removing one or more parameters from said discard list which are used by tags which are not associated with said first parameter in response to not locating said value of said first parameter.

10. The method as recited in claim 8 further comprising:
removing a parameter from said discard list that corresponds to a next parameter in said list to be processed in response to not locating said value of said first parameter.

11. A method for resolving values of parameters of tags, the method comprising:
identifying a parameter of a tag in a web page in a nested expression format, wherein said tag comprises code that collects data;
breaking up, by a processor, said nested expression into components;
processing a leftmost component of said nested expression that has not yet been processed;
processing a subsequent leftmost component of said nested expression that has not yet been processed in response to obtaining a value of said leftmost component of said nested expression; and
returning a value of said nested expression format in response to obtaining a value for each of said components of said nested expression, wherein said returned value corresponds to a value of a rightmost component of said nested expression.

12. The method as recited in claim 11 further comprising:
indicating that said tag cannot be resolved in response to a value of a component of said nested expression not being able to be obtained.

* * * * *